Aug. 4, 1959    L. J. KIVISTO ET AL    2,897,787
SERVO-MOTOR

Filed July 29, 1955    3 Sheets-Sheet 1

Inventors:
Lauri J. Kivisto
Thomas R. Seddon
Paul O. Pippel
Atty.

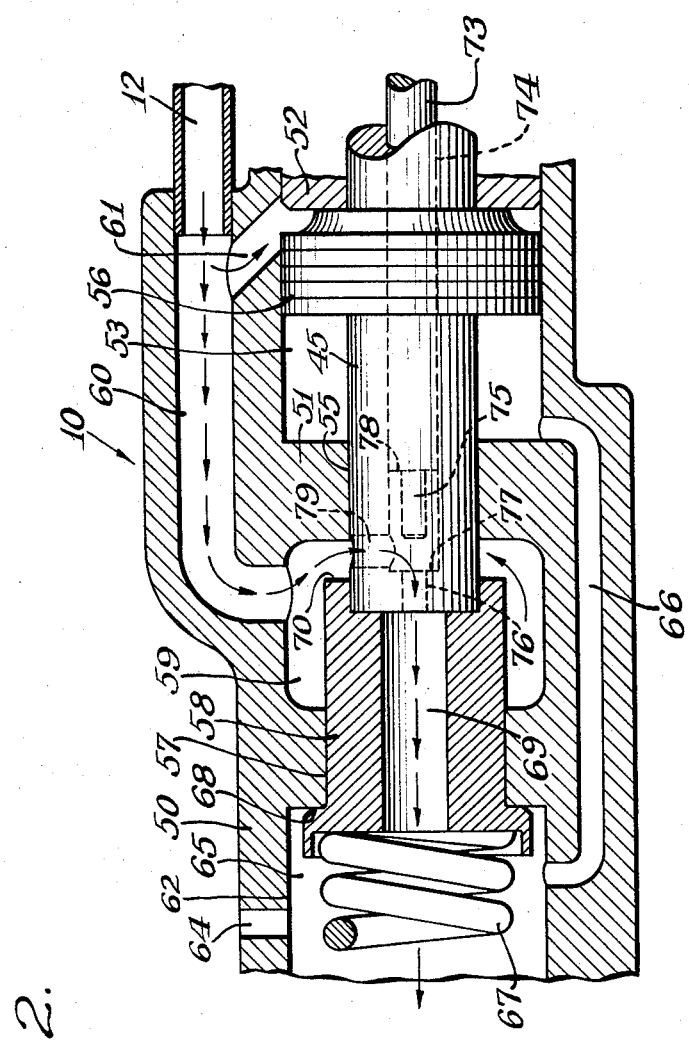

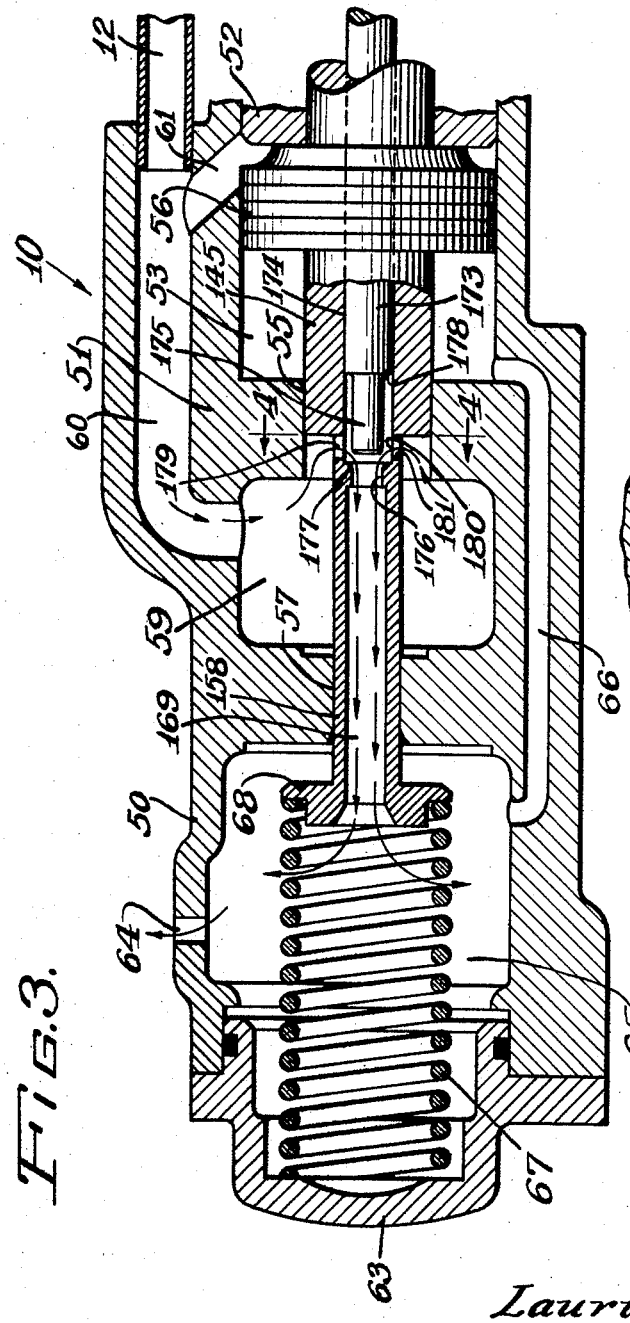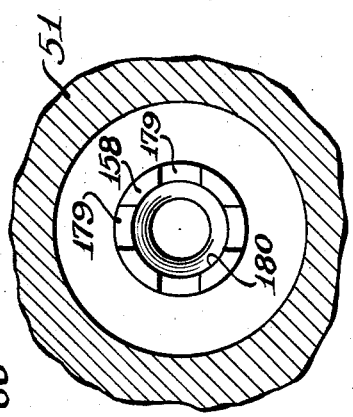

United States Patent Office 2,897,787
Patented Aug. 4, 1959

2,897,787

SERVO-MOTOR

Lauri J. Kivisto, Chicago, and Thomas R. Seddon, Roselle, Ill., assignors to International Harvester Company, a corporation of New Jersey Application July 29, 1955, Serial No. 525,219

10 Claims. (Cl. 121—41)

This invention relates to power driven vehicles of the kind which are steered by driving. More in particular this invention concerns vehicles steered by independent control of the drive means for the ground engaging elements disposed on opposite sides of the vehicle.

Particularly in endless track type vehicles such as crawler tractors, steering is accomplished by controlling the relative rates of movement of the endless track ground engaging elements on each side of the vehicle. One type of construction employs a differential drive to the track elements and steering is effected by braking one track element thus changing the course of direction of the vehicle's travel. Another type of construction interposes a pair of coupling devices such as friction clutches and the like, one being disposed in the drive means to each of the track elements. Thus when both coupling devices are fully engaged the track elements move in unison and the vehicle proceeds in a straight course. To change the vehicle's course one of the coupling devices is either partly or totally disengaged which reduces or terminates the relative speed of the associated track element. Still another type of construction employs a combination of both coupling and brake means associated with each of the ground engaging elements.

Particularly in the larger type vehicles the coupling or braking means associated with the steering-by-driving mechanism requires considerable force to actuate the coupling (or braking) means such that if the required force is provided solely from manual effort the operator tends to become unduly fatigued. It is therefore a prime object of this invention to provide an improved power operated steering-by-driving control means whereby the physical effort required of the operator is substantially reduced to eliminate undue fatigue.

It is another object of this invention to provide fluid power means for actuating the steering-by-driving mechanism of a vehicle whereby the physical effort required of the operator is limited substantially to the nominal force necessary to operate the control valve means associated with said fluid power means.

Still another object of this invention is to provide safety means for manually actuating the steering-by-driving mechanism in the event of failure of the source of fluid under pressure associated with the fluid power means of said invention.

These and other important and desirable objects inherent and encompassed by the invention are further evident in the ensuing description of preferred embodiments, the appended claims and the annexed drawings wherein:

Figure 2 is an enlarged side view, in section partly broken away, illustrating in detail the construction of one fluid power unit embodying the invention.

Figure 3 is a side view, in section, similar to Figure 2 except that it illustrates a modified form of the invention wherein the necessity for fluid flow through a portion of the movable work member is eliminated.

Figure 4 is a detail in section of the control valve arrangement taken on the line 4—4 of Figure 3 illustrating the construction of valve ports.

Figure 1:
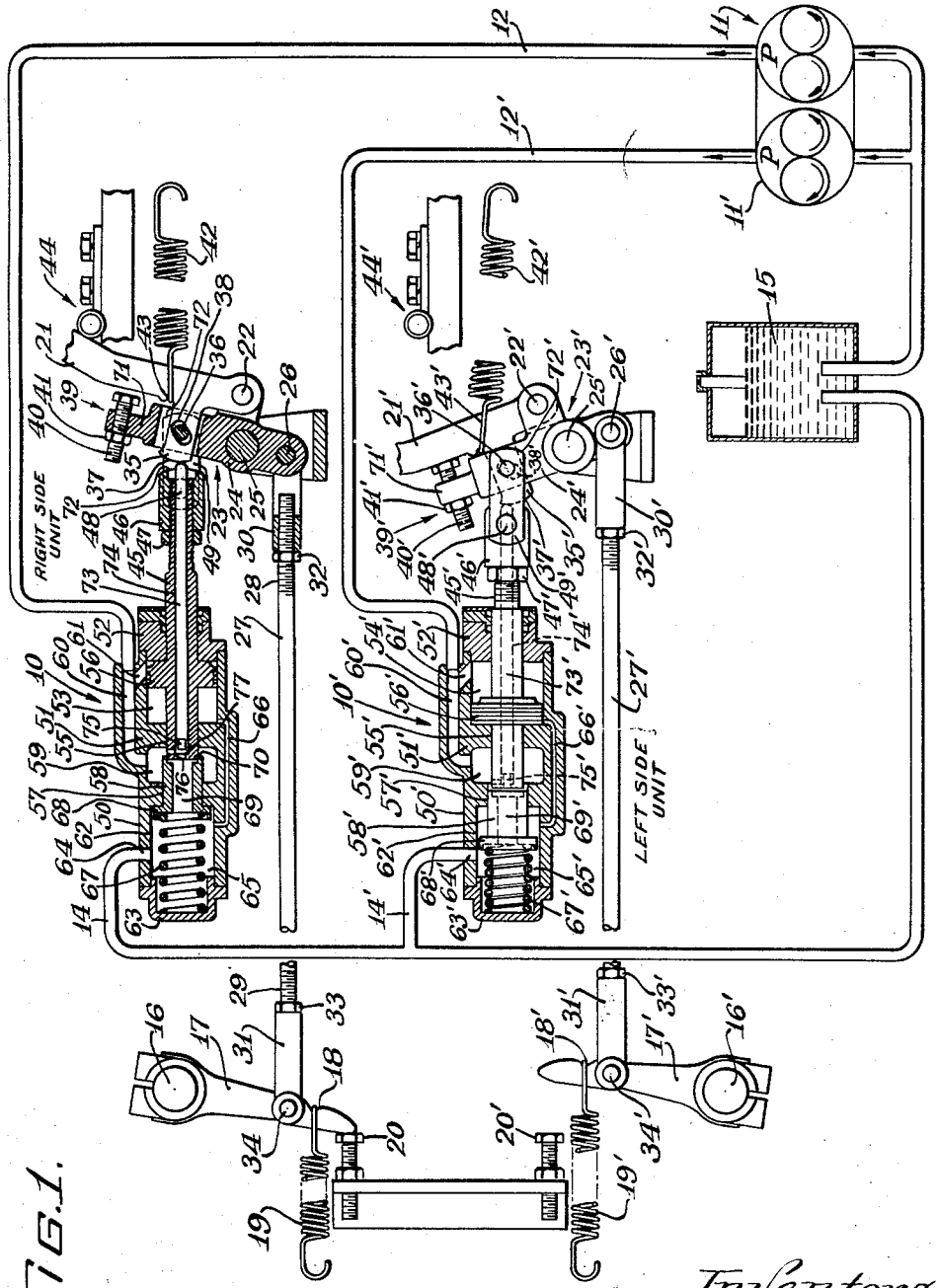
Figure 1 is a side view, partly in section and partly diagrammatic, illustrating right and left side fluid power means for actuating the drive coupling devices on the respective sides of the vehicle, the lower or left side unit shown in operating position while the upper or right side unit in a non-operating position.

Referring to Figure 1 there is illustrated a pair of the fluid power units or servo-motors of this invention, the top unit generally indicated at 10, serves to control the coupling device of the drive to the ground engaging elements on the right hand side of a vehicle (not shown). Similarly 10' generally indicates a second fluid power unit which serves to control the coupling device of the drive to the ground engaging elements on the left side of the vehicle. Since the construction of both left and right power units comprising this invention are identical, for simplicity like parts for both left and right units bear the same numerical designations except that the numerals relating to the left unit are primed. Therefore only the right side power unit of this invention is described herein and it will be understood that the construction of the second or left side power unit is the same.

The pump 11 mounted on the vehicle is a source of fluid under pressure delivered to the servo-motor 10 through the conduit 12. The conduit 14 is provided as a return means of the fluid back to the pump 11. For convenience and economy the conduits 14 and 14' may be connected together and returned to pumps 11 and 11' through a common fluid reservoir 15. It will be understood that the return conduits 14 and 14' and the reservoir 15 may be eliminated if the fluid used is a gas such as air under pressure.

The numeral 16 is a rotative shaft of an actuator mechanism (not shown) which controls the engagement or disengagement of a clutch or coupling device (not shown) interposed in the drive train of the vehicle to the ground engaging element. An actuator arm 17 is rigidly secured to the shaft 16 for rotative movement therewith. A hook portion 18 of the arm 17 is connected to a spring 19 for urging the arm 17 and associated actuator shaft 16 into position for causing engagement of the coupling device for driving connection between the vehicle's power source and the associated ground engaging element. Stop means 20 mounted on the vehicle is provided for limiting the rotative movement in the direction for engagement of the coupling device. Thus it will be noted from Figure 1 that the right side actuator mechanism as shown by the position of arm 17 that the right hand ground engaging element is drivingly connected with the vehicle's power plant. It will also be noted that the left side actuator mechanism as shown by the position of arm 17' with respect to the stop 20' that the left side coupling device is disengaged and therefore the left side ground engaging element is not in driving connection with the vehicle's power plant.

A manually operable control lever 21 (partly shown) is pivotally mounted at 22 on one leg of a rock arm 24 of a linkage assembly generally indicated at 23. The linkage assembly may comprise a rock arm 24 pivotally mounted to a stub shaft 25 which stub shaft is suitably mounted on the vehicle. A second leg of the rock arm 24 is pivotally connected at 26 to a bifurcated lug 30. The lug 30 is provided with a left-hand threaded bore adapted to receive a left-hand threaded end portion 28 of a rod 27. A left-hand threaded locking nut 32 is provided on threads 28 in abutting relation to the lug 30 to prevent rotative movement of the rod 27. The other end of rod 27 is provided with a right-hand threaded portion 29 received in a right-hand threaded bore of a bifurcated lug 31. The bifurcated portion of the lug 31 is pivotally connected to the actuator arm 17 at 34. A right-hand threaded nut 33 is provided on the threaded portion 29 in abutting relation to lug 31 to further prevent rotative movement of the rod 27. From this it can be seen that the relative distance between the lugs 30 and 31 is adjustable by first loosening nuts 32 and 33 and rotating the rod 27 to the desired adjusted distance between lugs 30 and 31 and thereafter tightening nuts 32 and 33 to prevent the further rotation of the rod 27.

A third or upper leg 71 of the rock arm 24 is of a bifurcated construction and is provided with a shaft 36 extending laterally through the bifurcation and protrudes beyond the outer surfaces thereof. A protruding arm 35 of the control lever 21 is pivotally connected to the shaft 36 between the bifurcations of the rock arm 24. The arm 35 is provided with a curved surface 37 for a purpose described later. The pivotal connection of the arm 35 to the shaft 36 is provided by means of an elongated laterally disposed bore 38 in the arm 35. The elongated bore 38 thus permits a limited rotative movement of the control lever 21 about the pivot mount 22. An adjustable stop means generally indicated at 39 is provided adjacent the top of the upper leg 71 of the rock arm 24 to adjustably limit the relative movement of the control lever 21 with respect to the rock arm 24. The stop 39 may be comprised of a bolt 40 threadedly fit into a bore in the top portion of the upper leg 71 of the rock arm 24. The head portion of the bolt 40 is positioned for abutment against the control lever 21 as shown in the lower illustration of Figure 1. A locking nut 41 is provided for locking the bolt 40 against rotative movement to maintain adjustment of the stop 39.

A spring 42 suitably anchored to the vehicle is connected to the control lever 21 at 43 for urging the lever 21 in a rearward direction as shown in Figure 1. Another stop generally indicated at 44 is suitably mounted on the vehicle to limit the rearward movement of the control lever 21.

The servo-motor 10 is provided with a work member 45 one end of which is threadedly fit into a bore of an adjustable cap nut 46. The outer end or head portion of the cap nut 46 is provided with a curved surface 72 for a purpose described later. A lock nut 47 is provided on the work member 45 in abutting relation to the cap nut 46 to prevent rotative movement of the cap nut 46. The cap nut 46 is provided with a pair of oppositely disposed stub shafts one of which is shown at 48. A pair of link elements one of which is shown at 49 are disposed on opposite sides of the cap nut 46 and are pivotally connected to the stub shafts 48 thereof. The other end of the link elements 49 are pivotally connected to the outer protruding end portions of the shaft 36. Thus, from the above, movable link means from the work member 45 and control lever 21 to the actuator arm 17 have been established.

The servo-motor 10 comprises a casing 50 having a front end wall 51 and a rear end wall 52 respectively disposed adjacent a front cylinder chamber 53 and a rear cylinder chamber 54. A first bore 55 is axially disposed in the front end wall 51 of the casing 50 and is adapted to slidably receive the other end portion of the work member 45. A piston 56 is integrally mounted on the work member 45 and is adapted to reciprocate between the front and rear cylinder chambers 53 and 54 in a commonly known manner. A second bore 57 is disposed axially in the casing 50 and is adapted to receive slidably a pressure relief valve element 58 as shown in Figures 1 and 2 and further described later.

Adjacent to and forwardly of the front end wall 51 is a fluid by-pass chamber 59 which comprises an elongated circumferential groove axially disposed in the casing 50. The by-pass chamber 59 is communicatively connected for fluid flow with the conduit 12 by an open inlet passage 60 in the casing 50. Also an open port 61 in the casing 50 communicates for fluid flow the rear cylinder chamber 54 with the open inlet passage 60.

The forward portion of the casing 50 comprises a large bore 62 closed at the forward end thereof by a cap 63 threadedly fitted in the end thereof, thus forming a fluid compartment 65 at the forward portion of the servo-motor 10. An open fluid outlet passage 64 in the casing 50 communicates the return conduit 14 with the compartment 65.

In order to provide fluid vent means for venting the front cylinder chamber 53 an open or first fluid passage 66 is provided in the casing 50 for communicating the front cylinder chamber 53 to the compartment 65 and the outlet passage 64.

The pressure relief valve element 58 is an elongated tubular shaped element slidably fitted into bore 57 for axial movement therein. A shoulder portion 68 of the relief valve element is disposed on the forward end thereof to provide stop means for limiting the movement of the element 58 in a rearward direction. A captive spring 67 anchored by the cap 63 engages the shoulder 68 to urge the element 58 in a rearward or closed direction. The relief valve element 58 is also provided with an axially disposed bore or second fluid passage 69 for communicating the compartment 65 and outlet passage 64 with the bypass chamber 59 under conditions described later.

The rearward end of the relief valve element 58 abuts against the other end of the work member 45 to prevent the aforesaid second fluid passage 69 into the compartment 65. However, when the fluid pressure in the bypass chamber 59 exceeds a predetermined limit, which limit is determinable by the compressive strength characteristics of the spring 67, the fluid pressure acting on the annular surface 70 causes forward movement of the relief valve element 58 thus parting the abutting relationship with the other end of the work member 45 to permit the fluid under excess pressure in the chamber 59 to bypass into the passage 69 to the compartment 65 and outlet passage 64.

At this point it may readily be appreciated that when fluid under pressure delivered through the open inlet passage 60 to the bypass chamber 59 is restricted or prevented from flowing through the passage 69 of the relief valve element 58 to the compartment 65 and outlet passage 64, the fluid pressure increases or builds up in the inlet passage 60 and port 61 as well as the rear cylinder chamber 54. As a consequence thereof the increased fluid pressure in the rear cylinder chamber 54 acts upon the piston 56 urging movement thereof including the work member 45 in a forward direction. On the other hand when the bypass chamber 59 is communicatively connected for fluid flow to the passage 69, compartment 65 and outlet passage 64 the fluid pressure in the inlet passage 60, port 61 and rear cylinder chamber 54 is substantially reduced and the piston 56 is returned rearwardly by the urging of springs 19, 42 and 67 which urging may be further supplemented by resilient means within the coupling device (not shown) acting through the actuator shaft 16.

In order to control the flow of fluid from the bypass chamber 59 to the passage 69 there is, as best shown in Figure 2, provided at the other end of the work member 45 adjacent the bypass chamber 59 a manually operable control valve. The control valve means comprises a valve control member 73 slidably contained in a third bore 74 axially disposed in the work member 45. One end of the valve control member 73 projects rearwardly of the work member 45 in abutting relation with the curved surface 37 of the arm 35 portion of the control lever 21. The other end of the valve control member 73 is provided with a pilot pin 75 for reception into a small bore 76 axially disposed at the other end of the work member 45. The pilot pin 75 is axially alined with and an integral part of the valve control member 73. The pilot pin 75, as shown in Figure 2, forms a shoulder or annular surface 78 with the other portion of the valve control member 73. From Figure 2 it can be seen that the small bore 76 is axially alined with and smaller than the bore 74 in the work member 45 thus forming an annular shaped control valve seat or shoulder 77.

In order to provide means for fluid flow from the bypass chamber 59 to the bore 74 one or more radial ports 79 are disposed in the work member 45 adjacent to the control valve seat 77. It will be noted that the bypass chamber 59 extends axially a sufficient distance to permit continual registration of the port 79 with the bypass chamber 59 for the entire limits of the stroke of the work member 45 and its associated piston 56. Thus the port 79 is always in communication for fluid flow with the bypass chamber 59.

Figures 3 and 4 illustrates a modification of the control valve wherein the same valve seat is employed for closing the control valve and the pressure relief valve.

In Figure 3 the work member 145 is provided with an axially extending hole or third bore 174. On the rearward end portion of the pressure relief valve element 158 there is provided one or more radially disposed ports 179 in continued registration with the bypass chamber 59. The ports 179 are open ended or of slot formation as shown in Figure 4. The extreme rearward end of the relief valve element 158 is normally in abutting relation with the other end of the work member 145. A small axially disposed bore 176 is provided in the rearward end portion of the relief valve element 158 and is adapted to receive slidably the pin 175 of the valve control member 173. A bore 180 axially disposed in the end portion of the relief valve element 158 is of the same dimension as bore 174 of the work member 145 and is in axial alinement therewith for reception of the valve control element 173 as shown in Figure 3. The small bore 176 with the bore 180 forms a control valve seat 177 adjacent to and forward of the ports 179. Thus it can be seen that the forward movement of the valve control member 173 causes engagement of the shoulder 178 with the control valve seat 177 simultaneously with the reception of pin 175 in the small bore 176 thereby terminating fluid communication between the bypass chamber 59 and the passage 169.

In the modified form of the invention shown in Figure 3 when the fluid pressure in the bypass chamber exceeds a predetermined limit, which limit is determinable by the compressive strength characteristics of the spring 67, the fluid pressure acting on surfaces 181 of the ports 179 causes forward movement of the relief valve element 158 thus parting the abutting relationship with the other end of the work member 145 to permit the fluid under excess pressure in the chamber 59 to bypass into the passage 169 to the compartment 65 and outlet passage 64.

*Operation*

Referring to the upper or right side servo-motor 10, it will be seen that this servo-motor is not in operation and therefore the right side coupling device is engaged for driving the ground engaging traction means on the right side of the vehicle. In this condition the fluid from the pressure side of the pump 11 enters the open inlet passage 60, thence into the bypass chamber 59, through the ports 79 into the front end portion of the bore 74, thence through the small bore 76 into the passage 69, compartment 65 to the outlet passage 64. Since the fluid from the pump is thereby bypassed, the fluid pressure in the port 61 and rear cylinder chamber 54 will be negligible and therefore no forward movement of the piston 56 and work member 45 will occur.

Now suppose the operator desires to disengage the coupling device, either partly or totally, to affect the drive connection to the associated ground engaging element. He moves the control lever or pedal 21 forwardly using a light but continued forward force. The elongated bores or holes 38 in the protruding arm 35 of the lever 21 allows initial forward movement of the lever 21 to abut the stop 39. This causes the curved surface 37 of the arm 35 abutting the one outwardly projecting end of the valve control member 73 to move the member 73 forwardly in relation to the work member 45. The forward movement of the valve control member 73 moves the pilot pin 75 into the small bore 76 to engage the shoulder 78 with the control valve seat 77 thereby terminating further passage of fluid from the bypass chamber 59 into passage 69. Since the pressure side of the pump 11 is now restricted from flow the pressure immediately builds up in the open inlet passage 60, port 61 and rear cylinder chamber 54 thus urging forwardly piston 56 and work member 45 to move the linkage assembly 23, actuating arm 17 and the actuator shaft 16 toward a disengaging position of the coupling device.

Now the moment the operator relaxes forward force of the control lever 21 the spring 42 causes rearward movement of the lever 21 thereby permitting the valve control member 73 to move rearwardly for reestablishing the bypassing of the fluid from chamber 59 to the outlet passage 64. The return or rearward movement of the piston 56 causes discharge of the fluid in the rear cylinder chamber 54 through port 61 into the inlet passage 60. The urging of the valve control member 73 rearwardly to abut the curved surface 37 on the arm 35 of the lever 21 results from the fluid pressure acting on the annular surface of the shoulder 78.

At any time should the fluid pressure delivered by the pump 11 exceed a predetermined limit irrespective of the position of the piston 56 and work member 45, the fluid pressure acts on the annular surface 70 of the relief valve element 58 sufficiently to cause forward movement of the element 58 against the force of spring 67 so that element 58 is separated from abutting relationship to the work member 45 thus permitting the discharge of fluid from the chamber 59 to the passage 69, compartment 65 to the outlet passage 64.

In the modified form of the invention as shown in Figures 3 and 4, the operation of the control lever 21 is identical with that explained above. However, in the bypass condition first explained above, the fluid from the pump 11 is bypassed from the chamber 59 through the ports or slots 179 through the small bore 176, passage 169 and compartment 65 to the outlet passage 64. Similarly as above when a light forward force is applied to the lever 21 the valve control member 173 is moved forwardly in relation to the work member 145. The pilot pin 175 is received into the small bore 176 and the shoulder 178 engages the control valve seat 177 thereby terminating flow of fluid between the chamber 59 and the outlet passage 64. Similarly as before this causes a pressure build up in the passage 60, port 61 and rear cylinder chamber 54 which acts on the piston 56 to urge forward movement thereof including the associated work member 145. When the forward force applied by the operator is relaxed the lever 21 moves rearwardly permitting the rearward movement of the valve control lever 173 in relation to the work member 145 thereby reestablishing fluid flow from the bypass chamber 59 through ports or slots 179 into the small bore 176 and passage 169 to the compartment 65 and outlet passage 64. The return or rearward movement of the piston 56 causes discharge of the fluid in the rear cylinder chamber 54 through port 61 into the inlet passage 61. The rearward movement of the valve control member 173 is caused by the fluid under pressure acting on the annular surface or shoulder 178 to overcome the small frictional resistance between the member 173 and bore 174. Thereafter the piston 56 and associated work member 145 is returned rearwardly by the urging of springs 19, 42 and 67 which may be augmented by the resilient means provided in the associated coupling device (not shown) acting through the shaft 16 and actuator arm 17.

At any time, in the modified form of the invention, should the fluid pressure delivered by the pump 11 exceed a predetermined limit irrespective of the position of the piston 56 and work member 145, the fluid pressure acts on the surfaces 181 of the ports or slots 179 of the relief valve element 158 sufficiently to cause forward movement of the element 158 against the force of spring 67 so that the element 158 is separated from abutting relationship to the work member 145 thus unseating the control valve seat 177 from the shoulder 178 permitting the discharge of fluid from the chamber 59 to the passage 169, compartment 65 and outlet passage 64.

In the event that for any reason a failure occurs in the source of fluid under pressure it is essential that provision be included for operating the coupling device by manual effort. In either form of the invention described, should fluid pressure failure occur, the operator merely applies the necessary manual force forwardly on the control lever 21. The curved surface 37 on the arm 35 of the lever 21 moves the valve control member 73 or 173 until the surface 37 abuts against the outer end curved surface 72 of the cap nut 46 thus engaging for forward movement the work member 45 or 145. It will be appreciated that in the absence of fluid pressure the piston 56 may be moved freely as both cylinder chambers 53 and 54 are vented through the passage 66 and port 61, respectively, without fluid obstruction. The linkage means connecting the lever 21 with the actuator shaft 16 allows corresponding actuation of the shaft 16 by manual movement of the lever 21. Thus in the event of fluid pressure failure steering of the vehicle by manual effort on the lever 21 may be accomplished with negligible resistance from the inoperative servo-motor 10.

Having thus described a limited number of preferred embodiments of the invention and concisely illustrating the same, we claim:

1. A fluid operated servo-motor comprising a casing, a reciprocable work member including a piston disposed in the rearward portion of said casing, a front cylinder chamber and a rear cylinder chamber disposed in the rearward portion of said casing, a front end wall and a rear end wall disposed in said casing, one end of said work member projecting through said rear end wall, a first bore axially disposed in said front end wall, the other end of said work member projecting slidably in said first bore, a fluid bypass chamber disposed in said casing, said bypass chamber being positioned adjacent to and forwardly of said front end wall, a second bore axially disposed in said casing adjacent to and forwardly of said bypass chamber, a pressure relief valve element disposed in said casing and projecting slidably into said second bore and adapted for movement in a forward direction when fluid pressure in said bypass chamber exceeds a predetermined limit, a compartment in said casing disposed adjacent to and forwardly of said bypass chamber, one end of said relief valve element projecting into said bypass chamber and the other end projecting into said compartment, stop means disposed on the other end of said relief valve element adapted to limit axial movement thereof in a rearward direction, a captive spring disposed in said compartment adapted to urge said relief valve element in a rearward direction, a third bore axially disposed in said work member, a control valve means disposed in said casing, said control valves means having a valve control member slidably disposed in said third bore, an externally mounted manually operable control lever adapted to engage said valve control member, one end of said valve control member projecting rearwardly of said work member and adapted for axial movement in a forward direction with said control lever, a source of fluid under pressure including fluid return means, said source of fluid under pressure communicatively connected to said rear cylinder chamber and said bypass chamber, said fluid return means communicatively connected to said compartment, a first fluid passage means communicatively connecting said front cylinder chamber and said compartment, a second fluid passage axially disposed through said relief valve element, and said control valve means being movable axially in said first bore and bypass chamber for communicating for fluid flow said bypass chamber and said second fluid passage when said valve control member is moved rearwardly in relation to said work member and alternately terminating fluid flow from said bypass chamber to said second passage when said valve control member is moved forwardly in relation to said work member.

2. A fluid operated servo-motor comprising a casing mounted on said vehicle, a reciprocable work member including a piston disposed in the rearward portion of said casing, a front cylinder chamber and a rear cylinder chamber disposed in the rearward portion of said casing, a front end wall and a rear end wall disposed in said casing, an externally mounted manually operable control lever, one end of said work member projecting through said rear end wall, a first bore axially disposed in said front end wall, the other end of said work member projecting slidably in said first bore, a fluid bypass chamber disposed in said casing, said bypass chamber being positioned adjacent to and forwardly of said front end wall, a second bore axially disposed in said casing adjacent to and forwardly of said bypass chamber, a pressure relief valve element disposed in said casing and projecting slidably into said second bore and adapted for movement in a forward direction when fluid pressure in said bypass chamber exceeds a predetermined limit, a compartment in said casing disposed adjacent to and forwardly of said bypass chamber, one end of said relief valve element projecting into said bypass chamber and the other end projecting into said compartment, stop means disposed on the other end of said relief valve element adapted to limit axial movement thereof in a rearward direction, a captive spring disposed in said compartment adapted to urge said relief valve element in a rearward direction, a third bore axially disposed in said work member, a valve control member slidably disposed in said third bore, one end of said valve control member projecting rearwardly of said work member and adapted for axial movement in a forward direction with said control lever, a source of fluid under pressure including fluid return means, said source of fluid under pressure communicatively connected to said rear cylinder chamber and said bypass chamber, said fluid return means communicatively connected to said compartment, a first fluid passage means communicatively connecting said front cylinder chamber and said compartment, a second fluid passage axially disposed through said relief valve element, a control valve seat disposed in the rearward portion of said relief valve element, said control valve seat being positioned to cooperate with said valve control member for communicating for fluid flow said bypass chamber and said second fluid passage when said valve control member is moved rearwardly in relation to said work member and alternately terminating fluid flow from said bypass chamber to said second passage when said valve control member is moved forwardly in relation to said work member to engage said control valve seat.

3. A fluid operated servo-motor comprising a casing mounted on said vehicle, a front cylinder chamber and a rear cylinder chamber disposed in a portion of said casing, a reciprocable piston disposed in said chambers, a work member connected to said piston adapted for reciprocation therewith, a control lever mounted externally of said casing, one end of said work member projecting through said casing, a bypass chamber disposed in said casing, the other end of said work member adapted to project into said bypass chamber, a bore axially disposed in said work member, a valve control member disposed in said bore, one end of said valve control member projecting outside of said work member and adapted for movement with said control lever, a compartment disposed in said casing, a pressure relief valve element disposed in said casing, said relief valve element projecting slidably into said compartment and bypass chamber, said relief valve element having fluid passage means connectable for communication between said compartment and said bypass chamber when the fluid pressure in said bypass chamber exceeds a predetermined limit, resilient means mounted in said compartment adapted to urge said relief valve element toward a closed position, a source of fluid under pressure including return means, said source of fluid under pressure connected to said bypass chamber and said rear cylinder chamber and said fluid return means connected to said compartment, means in said casing for communicating for fluid flow said front cylinder chamber and said compartment, a fluid passage disposed in said relief valve element communicatively connectable for fluid flow from said bypass chamber to said compartment, a control valve seat disposed in the rearward portion of said relief valve element, said control valve seat being positioned to cooperate with said valve control member for communicating for fluid flow said bypass chamber and said fluid passage when said valve control member is moved in one direction in relation to said work member and alternately terminating fluid flow from said bypass chamber to said passage when said valve control member is moved in the other direction in relation to said work member to engage said control valve seat.

4. A fluid operated servo-motor comprising a casing having a reciprocable work member including a piston therein, one end of said work member projecting through said casing, a front cylinder chamber disposed in said casing adjacent one side of said piston and a rear cylinder chamber disposed adjacent the opposite side of said piston, a source of fluid pressure including fluid return means, an open inlet passage disposed in said casing communicatively connecting for fluid flow said rear cylinder chamber with said source of fluid under pressure, a compartment disposed in said casing communicatively connecting for fluid flow said compartment and front cylinder chamber with said fluid return means, a fluid bypass chamber disposed in said casing communicatively connected for fluid flow with said open inlet passage, a fluid pressure relief valve element slidably disposed in said casing extending into said bypass chamber and compartment, resilient means mounted within said compartment adapted to urge said relief valve element toward a closed position, said relief valve element being adapted to communicate for fluid flow said bypass chamber and said compartment when said fluid under pressure exceeds a predetermined limit, an externally mounted manually operable control lever, said control lever being operatively connected to said actuating means, a valve control member slidably disposed for axial movement in said work member, one end of said valve control member extending outside said work member and being operatively associated with said control lever, a control valve seat disposed in the rearward portion of said relief valve element, said control valve seat being positioned to cooperate with said valve control member for communicating for fluid flow said bypass chamber and said compartment when said valve control member is moved in one direction in relation to said work member and alternately terminating fluid flow from said bypass chamber to said compartment when said valve control member is moved in the other direction in relation to said work member to engage said control valve seat.

5. A fluid operated servo-motor comprising a stationary casing having a reciprocable work member including a piston disposed therein, one end of said work member projecting through said casing, an open inlet passage in said casing adapted to communicate a source of fluid under pressure to one side of said piston, a bypass chamber disposed in said casing communicatively connected to said inlet passage, a compartment disposed in said casing, an open outlet passage disposed in said casing communicatively connected to said compartment and the other side of said piston, a pressure relief valve element disposed in said bypass chamber and projecting into said compartment, means for urging said relief valve element toward a closed position, said relief valve element being adapted to communicate for fluid flow said bypass chamber with said compartment when said fluid pressure exceeds a predetermined limit, an externally mounted manually operable control lever, said control lever being operatively connected to said actuating means, a valve control member slidably disposed for axial movement in said work member, one end of said valve control member extending outside said work member and being operatively associated with said control lever, a control valve seat disposed in said relief valve element, said control valve seat being positioned to cooperate with said valve control member for communicating for fluid flow said bypass chamber and said outlet passage when said valve control member is moved in one direction in relation to said work member and alternately terminating fluid flow from said bypass chamber to said outlet passage when said valve control member is moved in the other direction in relation to said work member to engage said control valve seat.

6. A fluid operated servo-motor comprising a casing mounted on said vehicle, a reciprocable work member including a piston disposed in the rearward portion of said casing, a front cylinder chamber and a rear cylinder chamber disposed in the rearward portion of said casing, a front end wall and a rear end wall disposed in said casing, an externally mounted manually operable control lever, one end of said work member projecting through said rear end wall, a first bore axially disposed in said front end wall, the other end of said work member projecting slidably in said first bore, a fluid bypass chamber disposed in said casing, said bypass chamber being positioned adjacent to and forwardly of said front end wall, a second bore axially disposed in said casing adjacent to and forwardly of said bypass chamber, a pressure relief valve disposed in said casing and projecting slidably into said second bore and adapted for movement in a forward direction when fluid pressure in said bypass chamber exceeds a predetermined limit, a compartment in said casing disposed adjacent to and forwardly of said bypass chamber, one end of said relief valve element projecting into said bypass chamber and the other end projecting into said compartment, stop means disposed on the other end of said relief valve element adapted to limit axial movement thereof in a rearward direction, a captive spring disposed in said compartment adapted to urge said relief valve element in a rearward direction, a third bore axially disposed in said work member, a valve control member slidably disposed in said third bore, one end of said valve control member projecting rearwardly of said work member and adapted for axial movement in a forward direction with said control lever, a source of fluid under pressure including fluid return means, said source of fluid under pressure communicatively connected to said rear cylinder chamber and said bypass chamber, said fluid return means communicatively connected to said compartment, a first fluid passage means communicatively connecting said front cylinder chamber and said compartment, a second fluid passage axially disposed through said relief valve element, a small bore axially disposed in the forward portion of said work member adapted to communicate for fluid flow said third bore and said second bore, a radial port disposed in the forward portion of said work member adapted to communicate for fluid flow said third bore and said bypass chamber, a control valve seat disposed at the forward end of said third bore, said control valve seat being positioned to cooperate with said valve control member for communicating for fluid flow said bypass chamber and said second fluid passage when said valve control member is moved rearwardly in relation to said work member and alternately terminating fluid flow from said bypass chamber to said second fluid passage when said valve control member is moved forwardly in relation to said work member to engage said control valve seat.

7. A fluid operated servo-motor comprising a casing mounted on said vehicle, a front cylinder chamber and a rear cylinder chamber disposed in a portion of said casing, a reciprocable piston disposed in said chambers, a work member connected to said piston adapted for reciprocation therewith, a control lever mounted externally of said casing, one end of said work member projecting through said casing and operatively connected to said control lever, one end of said work member projecting through said casing, a bypass chamber disposed in said casing, the other end of said work member adapted to project into said bypass chamber, a bore axially disposed in said work member, a valve control member disposed in said bore, one end of said valve control member projecting outside said work member and adapted for movement with said control lever, a compartment disposed in said casing, a pressure relief valve element disposed in said casing, said relief valve element projecting slidably into said compartment and bypass chamber, said relief valve element having fluid passage means connectable for communication between said compartment and said bypass chamber when the fluid pressure in said bypass chamber exceeds a predetermined limit, resilient means mounted in said compartment adapted to urge said relief valve element toward a closed position, a source of fluid under pressure including return means, said source of fluid under pressure connected to said bypass chamber and said rear cylinder chamber and said fluid return means connected to said compartment, means in said casing for communicating for fluid flow said front cylinder chamber and said compartment, a fluid passage disposed in said relief valve element communicatively connectable for fluid flow from said bypass chamber to said compartment, port means disposed in the other end of said work member connectable for communicative flow of fluid from said bypass chamber through said fluid passage of said relief valve element, a control valve seat disposed in said bore at the other end of said work member, said control valve seat being positioned to cooperate with said valve control member for communicating for fluid flow said bypass chamber and said compartment when said valve control member is moved in one direction in relation to said work member and alternately terminating fluid flow from said bypass chamber to said compartment when said valve control member is moved in the other direction in relation to said work member to engage said control valve seat.

8. A fluid operated servo-motor comprising a casing having a reciprocable work member including a piston therein, one end of said work member projecting through said casing, a front cylinder chamber disposed in said casing adjacent one side of said piston and a rear cylinder chamber disposed on the opposite side of said piston, a source of fluid under pressure including fluid return means, an open inlet passage disposed in said casing communicatively connecting for fluid flow said rear cylinder chamber with said source of fluid under pressure, a compartment disposed in said casing, an open outlet passage disposed in said casing communicatively connecting for fluid flow said compartment and said front cylinder chamber with said fluid return means, a fluid bypass chamber disposed in said casing communicatively connected for fluid flow with said open inlet passage, a fluid pressure relief valve element slidably disposed in said casing extending into said bypass chamber and compartment, a resilient means mounted within said compartment adapted to urge said work member rearwardly and concurrently urge said relief valve element toward a closed position, said relief valve element being adapted to communicate for fluid flow said bypass chamber and said compartment when said fluid under pressure exceeds a predetermined limit, an externally mounted manually operable control lever, a valve control member slidably disposed for axial movement in said work member, one end of said valve control member extending outside said work member and being operatively associated with said control lever, port means disposed in the other end of said work member connectable for communicative flow of fluid from said bypass chamber to said compartment, a control valve seat disposed in the other end portion of said work member, said control valve seat being positioned to cooperate with said valve control member for communicating for fluid flow said bypass chamber and said compartment when said valve control member is moved in one direction in relation to said work member and alternately terminating fluid flow from said bypass chamber to said compartment when said valve control member is moved in the other direction in relation to said work member to engage said control valve seat.

9. A fluid operated servo-motor comprising a stationary casing having a reciprocable work member including a piston mounted therein, one end of said work member projection through said casing, an open inlet passage in said casing adapted to communicate a source of fluid under pressure to one side of said piston, a bypass chamber disposed in said casing communicatively connected to said inlet passage, a compartment disposed in said casing, an open outlet passage disposed in said casing communicatively connected to said compartment and the other side of said pistion, a pressure relief valve element disposed in said bypass chamber and projecting into said compartment, a means for urging said work member rearwardly and concurrently urge said relief valve element toward a closed position, said relief valve element adapted to communicate for fluid flow said bypass chamber with said compartment when said fluid pressure exceeds a predetermined limit, an externally mounted manually operable control lever, a valve control member disposed in said work member, one end of said valve control member extending outside said work member and being operatively associated with said control lever, port means disposed in the other end portion of said work member connectable for communicative flow of fluid from said bypass chamber to said compartment, a control valve seat disposed in the other end of said work member adjacent said port means, said control valve seat being positioned to cooperate with said valve control member for communicating for fluid flow said bypass chamber and said outlet passage when said valve control member is moved in one direction in relation to said work member and alternately terminating fluid flow from said bypass chamber to said outlet passage when said valve control member is moved in the other direction in relation to said work member to engage said control valve seat.

10. A fluid operated motor comprising a stationary casing, a reciprocable work member including a piston disposed axially in said casing, one end of said work member projecting outside of said casing, a source of fluid pressure, a pressure relief valve element slidably disposed in said casing in axial alignment with said work member, means for urging said relief valve element toward a closed position in abutting relation with said work member, an open inlet passage disposed in said casing communicatively connected to said source of fluid under pressure, a bypass chamber disposed adjacent one end of said relief valve element, a bore axially disposed in said relief valve element communicatively connected for fluid flow to an outlet passage in said casing, said relief valve element being adapted to communicate for fluid flow said bypass chamber with said outlet passage when the fluid pressure in said bypass chamber exceeds a predetermined limit, open means connecting for fluid flow one side of said piston and bypass chamber with said inlet passage, and manually operable control valve means disposed in said casing openable for communicating for fluid flow said bypass chamber and said outlet passage and alternately closable for terminating fluid communication from said bypass chamber and said outlet passage.

References Cited in the file of this patent

UNITED STATES PATENTS

| | | |
|---|---|---|
| 1,960,996 | Guernsey | May 29, 1934 |
| 2,002,315 | Furgason | May 21, 1935 |
| 2,007,423 | Davis | July 29, 1935 |
| 2,392,729 | Edge | Jan. 8, 1946 |
| 2,661,597 | Edge | Dec. 8, 1953 |

FOREIGN PATENTS

| | | |
|---|---|---|
| 541,233 | Great Britain | Nov. 19, 1941 |

UNITED STATES PATENT OFFICE

CERTIFICATE OF CORRECTION

Patent No. 2,897,787                                                       August 4, 1959

Lauri J. Kivisto et al

It is hereby certified that error appears in the printed specification of the above numbered patent requiring correction and that the said Letters Patent should read as corrected below.

Column 8, lines 14, and 65, and column 10, line 29, and column 11, line 9, each occurrence, strike out "mounted on said vehicle".

Signed and sealed this 29th day of March 1960.

(SEAL)
Attest:

KARL H. AXLINE                                                     ROBERT C. WATSON
Attesting Officer                                               Commissioner of Patents